United States Patent Office 3,420,848
Patented Jan. 7, 1969

3,420,848
DIBENZOCYCLOHEPTANE DERIVATIVES
Ernst Jucker, Ettingen, and Anton Ebnöther, Reinach, Basel-Land, Switzerland, assignors to Sandoz Ltd., Basel, Switzerland
No Drawing. Continuation-in-part of application Ser. No. 207,411, July 3, 1962. This application May 18, 1964, Ser. No. 368,358
U.S. Cl. 260—326.81     2 Claims
Int. Cl. C07d 87/28; C07d 27/24; C07d 27/28

ABSTRACT OF THE DISCLOSURE

Dibenzocycloheptane derivatives (I) particularly useful as antidepressants are provided as well as the 5-OH intermediates (II) which are also antitussives. Especially good compounds (I) are 5-(2'-pyrrolidino-ethylidene)-dibenzo[a,e] cycloheptatriene, 5-(2'-dimethylamino-ethylidene)-dibenzo[a,d]cyclohepta[1,4]diene, 5-(2'-pyrrolidino-ethylidene)-dibenzo[a,d]cyclohepta[1,4]diene, and 5-(2'-dimethylamino - ethylidene) - dibenzo[a,d]cyclohepta[1,4]diene. Effective antitussives (II) are 5-hydroxy-5-(2'-dimethylaminoethyl) - dibenzo[a,e]cycloheptatriene, 5 - hydroxy - 5 - (2' - dimethylaminoethyl) - dibenzo[a,d]cyclohepta[1,4]diene and 5-hydroxy-5-[1'-methyl-pyrrolidyl-(3')]-dibenzo[a,d]cyclohepta[1,4]diene.

---

This is a continuation-in-part of application Ser. No. 207,411, filed July 3, 1962, which has been abandoned.
The invention provides compounds of the formula:

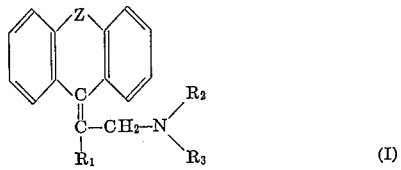

(I)

wherein $R_1$ represents a member selected from the group consisting of hydrogen and methyl, each of $R_2$ and $R_3$ taken individually represents methyl, $R_2$ and $R_3$ taken collectively with the nitrogen atom to which they are joined are a member selected from the group consisting of pyrrolidino and morpholino, $R_2$ together with $R_1$ represents a member selected from the group consisting of dimethylene and tetramethylene and Z is a member selected from the group consisting of —CH=CH— and —CH$_2$—CH$_2$—. The invention also provides acid addition salts of the compounds of Formula I with organic and inorganic acids and pharmaceutical compositions comprising, in addition to an inert carrier, a said compound and/or an acid addition salt thereof in a therapeutically effective amount.

The invention further provides compounds of the formula:

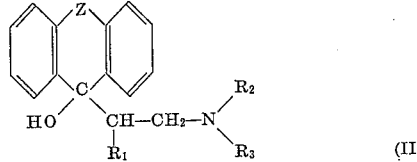

(II)

wherein $R_1$ represents a member selected from the group consisting of hydrogen and methyl, each of $R_2$ and $R_3$ taken individually represents methyl, $R_2$ and $R_3$ taken collectively with the nitrogen atom to which they are joined are a member selected from the group consisting of pyrrolidino and morpholino, $R_2$ together with $R_1$ represents a member selected from the group consisting of dimethylene and tetramethylene and Z is a member selected from the group consisting of —CH=CH— and —CH$_2$—CH$_2$—. The invention also provides acid addition salts of the compounds of Formula II with organic and inorganic acids and pharmaceutical compositions comprising, in addition to an inert carrier, a said compound and/or an acid addition salt thereof in a therapeutically effective amount.

The new compounds I and their acid addition salts are prepared from a compound of the Formula II in which $R_1$, $R_2$, $R_3$ and Z have the above significance, which is dehydrated to give the corresponding (dibenzocycloheptatriene - 5 - ylidene)- or (dibenzocycloheptadiene - 5-ylidene)- derivative, and when Z is —CH=CH— and a compound in which Z is —CH$_2$—CH$_2$— is required, the double bond in the 10,11-position is hydrogenated, and when an acid addition salt is required, the end product is reacted with an organic or inorganic acid. The hydrogenation of any double bond present in the 10,11-position may be effected either before or after the dehydration.

The compounds II may be obtained by reducing a compound of the formula:

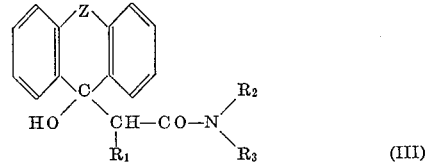

(III)

in which $R_1$, $R_2$, $R_3$ and Z have the above significance.
The compounds of Formula III may be produced by condensing a compound of the Formula IV:

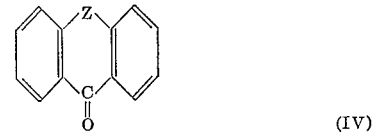

(IV)

in which Z has the above significance, with a compound of the Formula V:

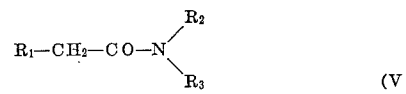

(V)

in which $R_1$, $R_2$ and $R_3$ have the above significance.
Suitable compounds V are, e.g., the dimethylamide, diethylamide, pyrrolidide or morpholide of acetic or propionic acid, as well as N-methyl-pyrrolidone-(2), N-ethylpyrrolidone-(2), N-isopropyl-pyrrolidone-(2) or N-methyl-ε-caprolactam.

The process may, for example, be effected as follows: A compound IV is added to a suspension of an alkali metal amide, e.g. sodium or potassium amide, in compound V, e.g. N,N-dimethylacetamide, at a temperature of 0–15°, said compound V, if it is not liquid, having been dissolved in a suitable solvent, e.g. tetrahydrofuran. The mixture is then kept at room temperature for a further 1 to 2 hours. The reaction product is then poured into water, whereupon the compound III separates out.

The process may also be effected in that a solution of a compound V in a suitable solvent, e.g. a solution of acetylmorpholine, acetylpyrrolidine, N-methyl-pyrrolidone-(2) or N-methyl-ε-caprolactam in tetrahydrofuran, is added to a suspension of an alkali metal amide, e.g. sodium or potassium amide in liquid ammonia and that a compound IV, dissolved in the same solvent, is then added. To complete the reaction, the mixture is kept at the boiling point of the ammonia for a further 1 to 2 hours and it is then poured into a solution of ammonium chloride in liquid ammonia. Compound III is then isolated and purified in accordance with methods known per se.

The reduction of the amide III is preferably effected with lithium aluminium hydride in an inert organic solvent, e.g. tetrahydrofuran. Subsequently the reaction complex is decomposed with a saturated sodium sulfate solution, the inorganic compounds are filtered off and the compound II isolated from the filtrate in accordance with known methods. Compound II may be purified by crystallization and, if an acid addition salt is required, it is reacted with a non-toxic, pharmaceutically acceptable, organic or inorganic acid. Suitable acids for this purpose are hydrochloric, hydrobromic, sulfuric, citric, tartaric, succinic, maleic, malic, acetic, benzoic, hexahydrobenzoic, methanesulfonic, fumaric and gallic acid.

The conversion of 5-hydroxy-dibenzo[a,e]cycloheptatriene derivatives to the corresponding 5-hydroxy-dibenzo[a,d]cyclohepta[1,4]diene derivatives also lies within the scope of this invention. This may be effected in that a compound II, in which Z is the radical —CH=CH—, is hydrogenated to the corresponding compound II, in which Z is the radical —CH$_2$—CH$_2$—. The hydrogenation of the double bond in the 10,11-position of compound II may, for example, be effected with sodium and alcohol, e.g. butanol or methylisobutylcarbinol. The dehydration may, for example, be effected by heating a compound II which may be dissolved in glacial acetic acid, with a strong acid, e.g. concentrated hydrochloric acid, or with acetic acid anhydride. The resulting compound I may then be purified and isolated in accordance with known methods.

Compounds I in which Z is the radical —CH$_2$—CH$_2$—, may be obtained from compounds I in which Z is the radical —CH=CH—, by catalytic hydrogenation with a palladium charcoal catalyst; in this way only the double bond in the 10,11-position is reduced.

At room temperature the compounds of Formula I are crystalline solids or oily liquids; they form salts which are crystalline at room temperature.

The prior art (Belgian Patent No. 578,122) discloses dibenzocycloheptatriene derivatives of the formula:

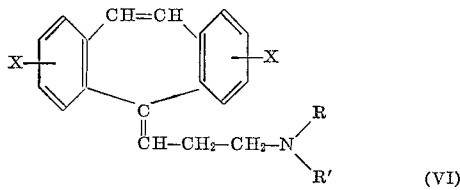

wherein R and R' represent lower alkyl, or

stands for pyrrolidino, piperidino, morpholino or N-alkyl piperazino, and X and X' represent hydrogen, chlorine, bromine or fluorine. These compounds may be obtained by a known process in that a Grignard reagent, prepared from an appropriate 3-tertiary aminopropyl halide, is reacted with a dibenzocycloheptatriene-5-one, the Grignard adduct being then hydrolyzed and the resulting 5-hydroxy derivative dehydrated to a compound of Formula VI. These compounds, especially 5-(3-dimethylaminopropylidene) - dibenzo[a,e]cycloheptatriene, are described to have tranquilizing properties and may be used as psychomotor depressants.

The new compounds (I) of this invention markedly differ from the already known compounds of Formula VI by having in the 5-position of the dibenzocycloheptane nucleus a novel type of basic side chain, the length of which being only two carbon atoms. This characteristic structural feature has hitherto not been encountered in the art, and the new compounds, accordingly, are not available by the already mentioned Grignard reaction but make it necessary to develop a new process for their preparation.

In contradistinction to the compounds of Formula VI it has been found that the compounds of Formula I have only slight tranquillizing porperties as evidenced e.g. by a merely weak narcosis potentiation. On the other hand they exert a distinct antagonism against the central effects of reserpine. They are furthermore characterized in having a strong histamine inhibiting action which is accompanied only by a minimum of undesirable side effects usually occurring in known antihistaminics. The compounds I exert furthermore antiallergic and serotonin inhibiting effects as well as a bronchodilatation. Thus, the invention provides a new pharmacological class of compounds, the pharmacodynamic properties of which being unexpected in this field.

These valuable properties are especially marked in the following compounds:

5-(2'-pyrrolidino-ethylidene)-dibenzo[a,e]cycloheptatriene, 5-(2'-dimethylamino-ethylidene)-dibenzo[a,d]cyclohepta[1,4]diene, 5-(2'-pyrrolidino-ethylidene)-dibenzo[a,d]cyclohepta[1,4]diene, and 5-(2'-dimethylamino-ethylidene)-dibenzo[a,d]cyclohepta[1,4]diene.

The compounds of Formula I may therefore be used as antidepressants as well as for the treatment of allergic conditions, including asthma bronchiale.

The compounds of Formula II, primarily, are useful intermediate products in that they can be dehydrated to compounds I or in that they can be reduced, preferably by the use of hydrogen iodide or any reagents that will produce hydrogen iodide, to the corresponding compounds which have the following saturated side chain:

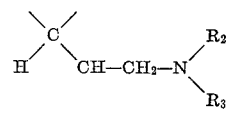

However, it has also been found that the following intermediates:

5-hydroxy-5-(2'-dimethylaminoethyl)-dibenzo[a,e]cycloheptatriene, 5-hydroxy-5-(2'-dimethylaminoethyl)-dibenzo[a,d]cyclohepta[1,4]diene, 5-hydroxy-5-[1'-methyl-pyrrolidyl-(3')]-dibenzo[a,d]cyclohepta[1,4]diene have a distinct cough inhibiting and bronchodilatory action. These compounds are therefore valuable chemotherapeutics for the treatment of coughs and asthmatic conditions. It must be emphasized that the literature on the art has not yet described any compound of the above or of a similar structure, possessing antitussive or bronchodilatory properties.

The invention thus comprises the new cyclic bases of Formula I, respectively II, and their acid addition salts, as well as pharmaceutical compositions for administration in unit dosage form consisting of a compound of said Formula I, respectively II, and/or an acid addition salt thereof and an inert carrier or vehicle. The invention further comprises the method of treating the above-named conditions or obtaining the above-noted therapeutic effects by administering to a patient the compounds of Formula I, respectively II, and/or their pharmaceutically acceptable, non-toxic acid addition salts in a therapeutically effective amount.

In the following non-limitative examples all temperatures are stated in degrees centigrade. The melting points are uncorrected.

EXAMPLE 1

5-(2'-dimethylaminoethylidene)-dibenzo[a,e] cycloheptatriene (a) [5-hydroxy - dibenzo[a,e]cycloheptatrienyl - (5)]-acetic acid dimethylamide.—10.3 g. of dibenzo[a,e]cycloheptatriene-5-one (melting point 89–90°) are added portionwise to a suspension of 4 g. of sodium amide in 20 cc. of N,N-dimethyl acetamide at 10°. After stirring for two hours at room temperature the reaction mixture is poured into 100 cc. of water and stirred for some time, the separated substance solidifying. The solution is filtered, the filter residue washed with water and crystallized from ethanol. [5-hydroxy-dibenzo[a,e]cycloheptatrienyl-(5)]-acetic acid dimethylamide melts at 156–158°.

(b) 5-hydroxy-5-(2' - dimethylaminoethyl) - dibenzo [a,e]cycloheptatriene.—A solution of 12.2 g. of [5-hydroxy-dibenzo[a,e]cycloheptatrienyl - (5)]-acetic acid dimethylamide in 50 cc. of absolute tetrahydrofuran are added dropwise to a solution of 2.14 g. of lithium aluminium hydride in 40 cc. of tetrahydrofuran during the course of ½ hour at 5°. The mixture is stirred for one hour at room temperature and then heated at reflux for two hours. The mixture is then cooled and a saturated sodium sulfate solution slowly added dropwise until a precipitate forms. This is filtered off and boiled twice with tetrahydrofuran. The combined filtrates are evaporated in a vacuum, the remaining oil dissolved in ethanol and the solution made acid to Congo Red indicator with ethereal hydrogen chloride. The precipitated 5-hydroxy-5-(2'-dimethylaminoethyl)-dibenzo[a,e]cycloheptatriene hydrochloride is filtered off and dissolved in methanol for the purpose of purification and precipitated with ether. The compound melts at 245° with foaming.

(c) 5-(2' - dimethylaminoethylidene) - dibenzo[a,e] cycloheptatriene.—A solution of 9.9 g. of 5-hydroxy-5-(2'-dimethylaminoethyl)-dibenzo[a,e]cycloheptatriene hydrochloride in 100 cc. of glacial acetic acid containing 40 cc. of hydrochloric acid is heated at reflux for one hour. The solution is subsequently evaporated in a vacuum, the residue dissolved in water, the solution made alkaline and extracted with ether. After drying over potassium carbonate and evaporation of the ether the remaining oil is dissolved in methanol and the calculated quantity of hydrochloric acid added thereto. After evaporation of the solvent in a vacuum the residue is dissolved in acetone from which the 5-(2'-dimethylaminoethylidene)-dibenzo [a,e]cycloheptatriene hydrochloride crystallizes. It is recrystallized from isopropanol. Melting point 209–211° (decomposition).

EXAMPLE 2

5-[1'-methyl-pyrrolidylidene-(3')]-dibenzo[a,e] cycloheptatriene (a) 5-hydroxy-5-[1'-methyl-2' - oxopyrrolidyl - (3')]-dibenzo[a,e]cycloheptatriene.—4.8 g. of finely pulverized sodium amide are dissolved in 25 cc. of N-methyl-pyrrolidone-(2) whilst stirring and 8.24 g. of dibenzo[a,e]cycloheptatriene-5-one (melting point 89–90°) slowly added to the solution at 0–10°. After stirring for two hours at room temperature the reaction mixture is poured into 500 cc. of water, the separated precipitate filtered off and dried in an exsiccator. After recrystallizing twice from acetone the compound melts at 149–151°.

(b) 5-hydroxy-5-[1'-methyl-pyrrolidyl-(3')] - dibenzo [a,e]cycloheptatriene.—7.7 g. of finely pulverized 5-hydroxy-5-[1'-methyl-2'-oxo-pyrrolidyl-(3')] - dibenzo[a,e] cycloheptatriene are added to a suspension of 1.85 g. of lithium aluminium hydride in 50 cc. of absolute tetrahydrofuran at 5° whilst stirring well. The mixture is stirred for two hours at room temperature and subsequently heated at reflux for one hour. The mixture is then cooled and a saturated sodium sulfate solution slowly added dropwise until a precipitate which may be easily filtered off separates. This is then filtered off and boiled twice with tetrahydrofuran. The combined filtrates are evaporated to dryness in a vacuum and the residue recrystallized from ethanol. 5-hydroxy-5-[1'-methyl-pyrrolidyl-(3')]-dibenzo[a,e]cycloheptatriene melts at 147–148°. After crystallization from ethanol the hydrochloride melts at 266–268° (decomposition).

(c) 5-[1'-methyl-pyrrolidylidene-(3')] - dibenzo[a,e] cycloheptatriene.—A solution of 7 g. of 5-hydroxy-5-[1'-methyl-pyrrolidyl-(3')]-dibenzo[a,e]cycloheptatriene in 30 cc. of glacial acetic acid is saturated with hydrogen chloride whilst cooling. 6.8 g. of acetic anhydride are then added and the mixture heated to 90–100° for four hours. The solution is then evaporated in a vacuum, the residue taken up in water, the solution made alkaline with a potassium hydroxide solution whilst cooling and extracted with benzene. After drying of the extract over potassium carbonate the solvent is evaporated in a vacuum and the residue crystallized from hexane, the 5-[1'-methyl-pyrrolidylidene - (3')] - dibenzo[a,e]cycloheptatriene having a melting point of 102–104° resulting.

After crystallization from ethanol the acid fumarate melts at 171–176° (decomposition).

EXAMPLE 3

5-(2'-morpholino-ethylidene)-dibenzo[a,e] cycloheptatriene (a) [5 - hydroxy-dibenzo[a,e]cycloheptatrienyl - (5)]-acetic acid morpholide.—10.3 g. of dibenzo[a,e]cycloheptatriene-5-one (melting point 89–90°) are added portionwise to a suspension of 4 g. of sodium amide in 20 cc. of acetyl morpholine at 5–10°. After the addition of 20 cc. of absolute tetrahydrofuran the mixture is stirred for a further ½ hour at room temperature. The solution is then poured into 500 cc. of water and stirred for some time. The separated precipitate is filtered off, washed with water, dried and recrystallized from acetone. Melting point 169–170°.

(b) 5-hydroxy-5-(2' - morpholinoethyl) - dibenzo[a,e] cycloheptatriene.—12.6 g. of [5-hydroxy-dibenzo[a,e] cycloheptatrienyl-(5)]-acetic acid morpholide is added portionwise to a solution of 2.1 g. of lithium aluminium hydride in 100 cc. of absolute tetrahydrofuran at 5–10°. After stirring for one hour at room temperature the mixture is heated at reflux for a further ½ hour. The mixture is then cooled and a saturated sodium sulfate solution slowly added dropwise until a precipitate forms. This precipitate is filtered off and boiled twice with tetrahydrofuran. The combined filtrates are evaporated in a vacuum and the residue recrystallized from acetone. Melting point 154–156°.

(c) 5-(2'-morpholino-ethylidene) - dibenzo[a,e]cycloheptatriene.—The solution of 9 g. of 5-hydroxy-5-(2'-morpholinoethyl)-dibenzo[a,e]cycloheptatriene in 90 cc. of concentrated hydrochloric acid is heated at reflux for one hour. The solution is subsequently evaporated in a vacuum, the residue taken up in acetone, the solution treated with activated animal charcoal and concentrated, the 5-(2' - morpholino - ethylidene) - dibenzo[a,e]cycloheptatriene hydrochloride crystallizing. This is recrystallized from acetone whereupon it melts at 202–204° with decomposition.

EXAMPLE 4

5-[1'-methyl-hexahydroazepinylidene-(3')]-dibenzo [a,e]cycloheptatriene (a) 5-hydroxy-5-[1'-methyl-2'-oxo-hexahydroazepinyl-(3')] - dibenzo[a,e]cycloheptatriene.—2.3 g. of sodium are dissolved in 100 cc. of liquid ammonia with the addition of a spatula tip of iron nitrate. A solution of 7 g. of N-methyl-ε-caprolactam in 5 cc. of tetrahydrofuran, and after ten minutes a solution of 10.3 g. of dibenzo[a,e] cycloheptatriene-5-one in 25 cc. of tetrahydrofuran are added dropwise to the sodium amide solution. The reaction solution is then stirred for one hour at the boiling temperature of the ammonia and then poured into a solution of 5.5 g. of ammonium chloride in 100 cc. of liquid ammonia. After evaporation of the ammonia, water is added to the residue, the undissolved compound filtered off and crystallized twice from acetone. Melting point 220–221°.

(b) 5-hydroxy-5-[1'-methyl - hexahydroazepinyl-(3')]- dibenzo[a,e]cycloheptatriene.—13.1 g. of 5-hydroxy-5- [1'-methyl-2'-oxo-hexahydroazepinyl(3')] - dibenzo[a,e] cycloheptatriene are added portionwise to a solution of 2.3 g. of lithium aluminium hydride in 100 cc. of absolute tetrahydrofuran at 5–10°. The reaction mixture is stirred for two hours at room temperature and then heated at reflux for a further hour. A saturated sodium sulfate solution is then slowly added dropwise whilst cooling well until a precipitate forms. This is filtered off and boiled twice with tetrahydrofuran. The combined filtrates are then evaporated in a vacuum and the resulting residue recrystallized from carbon tetrachloride and then from ethyl acetate. The compound melts at 154–155°.

(c) 5-[1' - methyl - hexahydroazepinylidene - (3')]-di- benzo[a,e]cycloheptatriene.—The solution of 7 g. of 5- hydroxy-5-[1'-methyl-hexahydroazepinyl - (3')]-dibenzo [a,e]cycloheptatriene in 70 cc. of concentrated hydro- chloric acid is heated at reflux for one hour. The solu- tion is then evaporated in a vacuum, the residue dissolved in water and after making the aqueous solution alkaline it is extracted with ether. The ether extract, which has been dried over potassium carbonate, is evaporated, the re- maining oil dissolved in methanol, the solution brought to a pH value of 5.5 with aqueous hydrogen bromide and evaporated. The 5-[1' - methyl-hexahydroazepinylidene- (3')]-dibenzo[a,e]cycloheptatriene hydrobromide is re- crystallized twice from ethanol. Melting point 208–210° (decomposition).

EXAMPLE 5

5-(2'-pyrrolidino-ethylidene)-dibenzo[a,e] cycloheptatriene (a) [5 - hydroxy - dibenzo[a,e]cycloheptatrienyl-(5)]- acetic acid pyrrolidide.—4 g. of pulverized sodium amide are carefully added to 25 cc. of acetyl pyrrolidine, am- monia being liberated. 10.3 g. of dibenzo[a,e]cyclohepta- triene-5-one are then added at 0–5° whilst stirring well. After the addition of 20 cc. of tetrahydrofuran the mix- ture is stirred at a temperature of 10° becoming a vivid violet after 15–20 minutes after having initially been light red. The solution is then immediately poured into 500 cc. of water, made neutral with glacial acetic acid and the precipitate filtered off after some time. The dried com- pound is recrystallized from acetone. Melting point 138– 140°.

(b) 5-hydroxy-5-(2' - pyrrolidinoethyl) - dibenzo[a,e] cycloheptatriene.—8.5 g. of [5' - hydroxy - dibenzo[a,e] cycloheptatrienyl-(5)]-acetic acid pyrrolidide are added portionwise to a solution of 1.5 g. of lithium aluminium hydride in 60 cc. of tetrahydrofuran at 5–10°. After stir- ring for one hour at room temperature the mixture is heated at reflux for a further hour. A saturated sodium sulfate solution is slowly added dropwise to the cooled solution until a precipitate forms. This is filtered off and boiled twice with tetrahydrofuran. The combined filtrates are evaporated and the residue recrystallized from ace- tone. Melting point 153–155°.

(c) 5-(2'-pyrrolidino-ethylidene) - dibenzo[a,e]cyclo- heptatriene.—3.6 g. of 5-hydroxy-5-(2'-pyrrolidinoethyl)- dibenzo[a,e]cycloheptatriene are heated at reflux for one hour with 35 cc. of glacial acetic acid which has been saturated with hydrogen chloride. The solution is sub- sequently evaporated to dryness in a vacuum. The re- sulting residue is dissolved in acetone containing 10% of water and moist ether added, the 5-(2'-pyrrolidino- ethylidene) - dibenzo[a,e]cycloheptatriene hydrochloride crystallizing with 1 mol of water of crystallization. The compound is recrystallized by dissolving in acetone con- taining 10% of water and adding moist ether. Melting point 108–120° (water of crystallization given off).

EXAMPLE 6

5-(dimethylamino-isopropylidene)-dibenzo[a,e] cycloheptatriene (a) α-[5-hydroxy-dibenzo[a,e]cycloheptatrienyl - (5)]- propionic acid dimethylamide.—2.3 g. of sodium are dis- solved in 100 cc. of liquid ammonia upon the addition of a spatula tip of iron nitrate. A solution of 5.5 g. of propi- onic acid dimethylamide in 5 cc. of tetrahydrofuran, and after 10 minutes a solution of 10.3 g. of dibenzo[a,e] cycloheptatriene-5-one in 25 cc. of tetrahydrofuran are added to the sodium amide solution. The reaction solution is then stirred for one hour at the boiling temperature of the ammonia and 5.5 g. of ammonium chloride are then added. After evaporation of the ammonia the residue is stirred with water, the precipitate filtered off and the com- pound crystallized from acetone. Melting point 198–200° (decomposition).

(b) 5-hydroxy - 5 - (1' - dimethylamino-isopropyl)-di- benzo[a,e]cycloheptatriene.—10.5 g. of α-[5-hydroxy-di- benzo[a,e]cycloheptatrienyl-(5)]-propionic acid dimeth- ylamide are added portionwise to a solution of 1.95 g. of lithium aluminium hydride in 10 cc. of tetrahydrofuran at approximately 5°. After stirring for two hours at room temperature the mixture is heated at reflux for a further hour. A saturated sodium sulfate solution is slowly added dropwise to the cooled solution until a precipitate forms. This is filtered off and boiled twice with tetrahydrofuran. The combined filtrates, are evaporated. The slowly crys- tallizing residue is recrystallized from hexane. The com- pound melts at 95–96°.

(c) 5 - (dimethylamino-isopropylidene) - dibenzo[a,e] cycloheptatriene.—6 g. of 5 - hydroxy - 5 - (1'-dimethyl- amino-isopropyl)-dibenzo[a,e]cycloheptatriene are heated at reflux for one hour with 60 cc. of concentrated hydro- chloric acid. The solution is evaporated in a vacuum and the residue dissolved in water. The solution which has been made alkaline is then extracted with ether. After drying over potassium carbonate the solvent is evapo- rated and the residue dissolved in ethanol. The calculated quantity of fumaric acid is then added to the ethanolic solution and the compound made to dissolve by heating for a short time. Upon cooling, the acid fumarate of 5- (dimethylamino - isopropylidene) - dibenzo[a,e]cyclohep- tatriene immediately crystallizes. After recrystallization from ethanol the acid fumarate melts at 186–188° (de- composition).

EXAMPLE 7

5-(2'-dimethylaminoethylidene)-dibenzo[a,d] cyclohepta[1,4]diene (a) {5 - hydroxy - dibenzo[a,d]cyclohepta[1,4]dienyl- (5)}-acetic acid dimethylamide.—A solution of 5.2 g. of N,N-dimethylacetamide in 5 cc. of tetrahydrofuran and then a solution of 10.4 g. of dibenzo[a,d]cyclohepta[1,4] diene-5-one (melting point 34–35°) in 20 cc. of tetra- hydrofuran are added dropwise to a solution of 4 g. of pulverized sodium amide in 100 cc. of liquid ammonia. The mixture is then stirred for one hour at the boiling point of the ammonia, the reaction mixture then poured into a solution of 5.5 g. of ammonium chloride in 100 cc. of liquid ammonia and the ammonia evaporated. The resulting residue is poured into 200 cc. of water and the compound crystallizing after some time filtered off. After recrystallization from ethanol the desired compound melts at 103–104°.

(b) 5 - hydroxy - 5 - (2'-dimethylaminoethyl)-dibenzo [a,d]cyclohepta[1,4]diene.—14.77 g. of {5 - hydroxy-di- benzo[a,d]cyclohepta[1,4]dienyl-(5)}-acetic acid dimeth- ylamide are added at 0–10° to a suspension of 2.85 g. of lithium aluminum hydride in 100 cc. of tetrahydrofuran. The reaction mixture is subsequently stirred at room tem- perature for one hour and then boiled at reflux for one hour. A saturated sodium sulfate solution is then added dropwise whilst cooling well until a precipitate forms. This is filtered off and boiled twice with tetrahydrofuran. The combined filtrates are evaporated in a vacuum, the residue dissolved in 30 cc. of ethanol and the solution made acid with ethereal hydrogen chloride, the hydrochloride of 5 - hydroxy - 5 - (2'-dimethylaminoethyl)-dibenzo[a,d]cyclohepta[1,4]diene crystallizing immediately. After recrystallization from ethanol the salt melts at 231–232° (decomposition).

(c) 5 - (2' - dimethylaminoethylidene) - dibenzo[a,d]cyclohepta[1,4]diene.—A solution of 6 g. of 5-hydroxy-5 - (2' - dimethylaminoethyl) - dibenzo[a,d]cyclohepta[1,4]diene hydrochloride in 60 cc. of concentrated hydrochloric acid is heated at reflux for one hour. The solution is subsequently evaporated in a vacuum and the resulting residue crystallized from acetone/ether, and then from isopropanol. The hydrochloride melts at 209–211° (decomposition).

EXAMPLE 8

5-(2'-morpholinoethylidene)-dibenzo[a,d]cyclohepta[1,4]diene (a) {5 - hydroxy - dibenzo[a,d]cyclohepta[1,4]dienyl-(5)}-acetic acid morpholide.—The desired {5 - hydroxy-dibenzo[a,d]cyclohepta[1,4]dienyl-(5)}-acetic acid morpholide having a melting point of 151–152° when crystallized from acetone is obtained from dibenzo[a,d]cyclohepta[1,4]diene-5-one and acetyl morpholine in a manner analogous to that described in Example 7(a).

(b) 5 - hydroxy - 5 - (2' - morpholinoethyl)-dibenzo[a,d]cyclohepta[1,4]diene.—The desired compound is obtained by the reduction of {5 - hydroxy-dibenzo[a,d]cyclohepta[1,4]dienyl-(5)}-acetic acid morpholide with lithium aluminium hydride in a manner analogous to that described in Example 7(b). Melting point 157–158° from acetone.

(c) 5 - (2' - morpholinoethylidene)-dibenzo[a,d]cyclohepta[1,4]diene.—5 - hydroxy - 5 - (2'-morpholinoethyl)-dibenzo[a,d]cyclohepta[1,4]diene is heated with concentrated hydrochloric acid in a manner analogous to that described in Example 7(c). The hydrochloride of the desired compound melts at 211–213° (decomposition) after recrystallization from acetone.

EXAMPLE 9

5-(2'-pyrrolidinoethylidene)-dibenzo[a,d]cyclohepta[1,4]diene (a) {5 - hydroxy - dibenzo[a,d]cyclohepta[1,4]dienyl-(5)}-acetic acid pyrrolidide.—A solution of 10.4 g. of dibenzo[a,d]cyclohepta[1,4]diene-5-one (melting point 34–35°) in 10 cc. of tetrahydrofuran is added dropwise to a suspension of 4 g. of pulverized sodium amide in 20 cc. of acetyl-pyrrolidine at 5°. The mixture is stirred for 20 minutes at 10°, poured into 200 cc. of water and the precipitated compound taken up in ether. The ethereal solution is dried over magnesium sulfate after shaking 3 times with water and evaporated. The residue is then treated with hexane, whereupon the compound crystallizes. Melting point 97–98° from isoproponol.

(b) 5 - hydroxy - 5 - (2' - pyrrolidinoethyl)-dibenzo[a,d]cyclohepta[1,4]diene.—The desired compound is obtained by reduction of {5-hydroxy-dibenzo[a,d]cyclohepta[1,4]dienyl-(5)}-acetic acid pyrrolidide with lithium aluminium hydride in a manner analogous to that described in Example 7(b). Melting point 147–148° from acetone.

(c) 5 - (2' - pyrrolidinoethylidene)-dibenzo[a,d]cyclohepta[1,4]diene.—5 - hydroxy - 5 - (2'-pyrrolidinoethyl)-dibenzo[a,d]cyclohepta[1,4]diene is heated with concentrated hydrochloric acid in a manner analogous to that described in Example 7(c) to produce the desired compound. After recrystallization from acetone the hydrochloride melts at 193–195° (decomposition).

EXAMPLE 10

5-[1'-methyl-pyrrolidylidene-(3')]dibenzo[a,d]cyclohepta[1,4]diene (a) 5 - hydroxy - 5 - [1' - methyl-pyrrolidyl-(3')]-dibenzo[a,d]cyclohepta[1,4]diene.—A solution of 10.4 g. of dibenzo[a,d]cyclohepta[1,4]diene-5-one in 10 cc. of tetrahydrofuran are added dropwise to a suspension of 4 g. of pulverized sodium amide in 20 cc. of N-methyl-pyrrolidone-(2) at 5°. The mixture is stirred for 20 minutes at 10° and the reaction mixture is then poured into 200 cc. of water. The compound which crystallizes after stirring for some time is filtered off and recrystallized from ethanol and ethyl acetate. A molecular combination consisting of 2 mol of 5 - hydroxy-5-[1'-methyl-2' - oxo - pyrrolidyl - (3')]-dibenzo[a,d]cyclohepta[1,4]diene and 1 mol of dibenzo[a,d]cyclohepta[1,4]diene-5-one and melting at 113–114° results. 6.3 g. of this combination are added to a suspension of 1.2 g. of lithium aluminium hydride in 50 cc. of tetrahydrofuran at 5°. The mixture is stirred for one hour at room temperature, then heated at reflux for one hour, cooled and a saturated sodium sulfate solution slowly added dropwise till a precipitate, which may be filtered off easily, forms. This precipitate is filtered off and boiled 3 times with tetrahydrofuran. The combined filtrates are evaporated and the residue recrystallized from acetone. Melting point 148–149°.

(b) 5-[1'-methyl-pyrrolidylidene-(3')]-dibenzo[a,d]cyclohepta[1,4]diene.—5 - hydroxy - 5[1'-methyl-pyrrolidyl-(3')]-dibenzo[a,d]cyclohepta[1,4]diene is heated with concentrated hydrochloric acid in a manner analogous to that described in Example 7(c) so as to produce the desired compound. The hydrochloride melts at 274–276° (decomposition) after recrystalliaztion from ethanol.

EXAMPLE 11

5-[1'-methyl-pyrrolidylidene-(3')]-dibenzo[a,e]-cyclohepta[1,4]diene

A solution of 1 g. of 5-[1'-methyl-pyrrolidylidene-(3')]-dibenzo[a,e]cycloheptatriene (produced according to Example 2(c) in 25 cc. of ethanol is shaken with 200 mg. of apalladium charcoal catalyst (10%) and hydrogen, whereby 1 mol of hydrogen is taken up slowly. The catalyst is then filtered off, the solution evaporated in a vacuum, the residue taken up in acetone and made acid with ethereal hydrogen chloride, the hydrochloride crystallizing immediately. It is recrystallized twice from ethanol. Melting point 274–276° (decomposition).

EXAMPLE 12

5-(1'-dimethylamino-isopropylidene)-dibenzo[a,d]cyclohepta[1,4]diene (a) 5-hydroxy-5-(1'-dimethylamino-isopropyl)-dibenzo[a,d]cyclohepta[1,4]diene.—5 g. of sodium are slowly added to a boiling solution of 5 g. of 5-hydroxy-5-(1'-dimethylamino - isopropyl - dibenzo[a,e]cycloheptatriene (produced according to Example 6) in 150 cc. of methyl-isobutylcarbinol. When the sodium has dissolved, the cold reaction mixture is shaken with water until the water gives a neutral reaction. After evaporation of the methyl-isobutyl-carbinol in a vacuum the residue is dissolved in acetone and the solution made acid with ethereal hydrogen chloride. The hydrochloride, resulting in crystalline form, is filtered off and recrystallized from ethanol/ether. Melting point 242° (decomposition).

(b) 5-(1'-dimethylamino-isopropylidene)-dibenzo[a,d]cyclohepta [1,4]diene.—5-hydroxy-5-(1'-dimethylamino-isopropyl)-dibenzo[a,d]cyclohepta[1,4]diene hydrochloride is heated with concentrated hydrochloric acid in a manner analogous to that described in Example 7(c) so as to produce the desired compound. After recrystallization from isopropanol the hydrochloride melts at 213–214°.

EXAMPLE 13

5-[1'-methyl-hexahydroazepinylidene-(3')]-dibenzo[a,d]cyclohepta[1,4]diene (a) 5-hydroxy-5-[1'-methyl-hexahydroazepinyl-(3')]-dibenzo[a,d]cyclohepta[1,4]diene. — 5-hydroxy-5-[1'-methyl-hexahydroazepinyl-(3')]-dibenzo[a,e]cycloheptatriene (produced according to Example 4) is reduced with sodium and methylisobutylcarbinol in a manner analogous to that described in Example 12 so as to produce the desired compound.

Hydrochloride: Melting point 234–237° (decomposition) from enthanol. It is hygroscopic.

(b) 5-[1'-methyl-hexahydroazepinylidene-(3')]-dibenzo[a,d]cyclohepta[1,4]diene.—The desired compound is produced by heating 5-hydroxy-5-[1'-methyl-hexahydroazepinyl-(3')]-dibenzo[a,d]cyclohepta[1,4]diene hydrochloride with concentrated hydrochloric acid in a manner analogous to that described in Example 7(c). The hydrochloride melts at 196–197° (decomposition) after recrystallization from isopropanol/ether.

What is claimed is:
1. 5-[1'-methyl-pyrrolidylidene-(3')]-dibenzo[a,e]cycloheptatriene.
2. 5-[1'-methyl-pyrrolidylidene-(3')]-dibenzo[a,d]cyclohepta[1,4]diene.

References Cited

UNITED STATES PATENTS

| | | | |
|---|---|---|---|
| 2,985,660 | 5/1961 | Judd et al. | 260—293 |
| 3,014,911 | 12/1961 | Engelhardt | 260—293 |

FOREIGN PATENTS

| | | |
|---|---|---|
| 99,624 | 5/1961 | Czechoslovakia. |

OTHER REFERENCES

Provita et al.: J. Med. Pharm. Chem., vol. 4, pp. 411–415, September 1961.

Winthrop et al.: J. Org. Chem., vol. 27, pp. 230–236, January 1962.

JOHN D. RANDOLPH, *Primary Examiner.*

U.S. Cl. X.R.

260—239.3, 240, 247.7, 559, 570.8, 999